United States Patent [19]

Bauer et al.

[11] 4,056,280
[45] Nov. 1, 1977

[54] DOOR FOR VEHICLES, IN PARTICULAR MOTOR VEHICLES

[75] Inventors: Andreas Bauer, Fallersleben; Wolfgang Lange, Nordsteimke, both of Germany

[73] Assignee: Volkswagenwerk Aktiengesellschaft, Wolfsburg, Germany

[21] Appl. No.: 563,509

[22] Filed: Mar. 31, 1975

[30] Foreign Application Priority Data

Apr. 9, 1974 Germany .............................. 2417192

[51] Int. Cl.² ............................................. B60J 5/04
[52] U.S. Cl. ..................................... 296/146; 49/502; 296/28 R
[58] Field of Search ............... 296/146, 149, 152, 153, 296/28 R, 154; 49/502; 280/748

[56] References Cited

U.S. PATENT DOCUMENTS

| 3,449,881 | 6/1969 | Wilfert | 296/146 X |
| 3,778,101 | 12/1973 | Tsuda | 49/502 X |
| 3,808,743 | 5/1974 | Renner et al. | 49/502 |
| 3,874,119 | 4/1975 | Renner et al. | 49/502 |
| 3,907,358 | 9/1975 | Barenyi et al. | 296/146 |

FOREIGN PATENT DOCUMENTS

| 7,333,238 | 1/1974 | Germany. | |
| 1,372,752 | 11/1974 | United Kingdom | 296/146 |
| 1,197,150 | 7/1970 | United Kingdom | 296/146 |

Primary Examiner—Robert J. Spar
Assistant Examiner—Winston H. Douglas
Attorney, Agent, or Firm—Brumbaugh, Graves, Donohue & Raymond

[57] ABSTRACT

A door for motor vehicles with a shaft for a drop window has a hollow-section longitudinal supporting member. The upper end of the supporting member is open to permit entry of the window. Flanges along the opening in the support member are arranged so that they will interlock during an impact on the door, thus increasing its strength.

6 Claims, 2 Drawing Figures

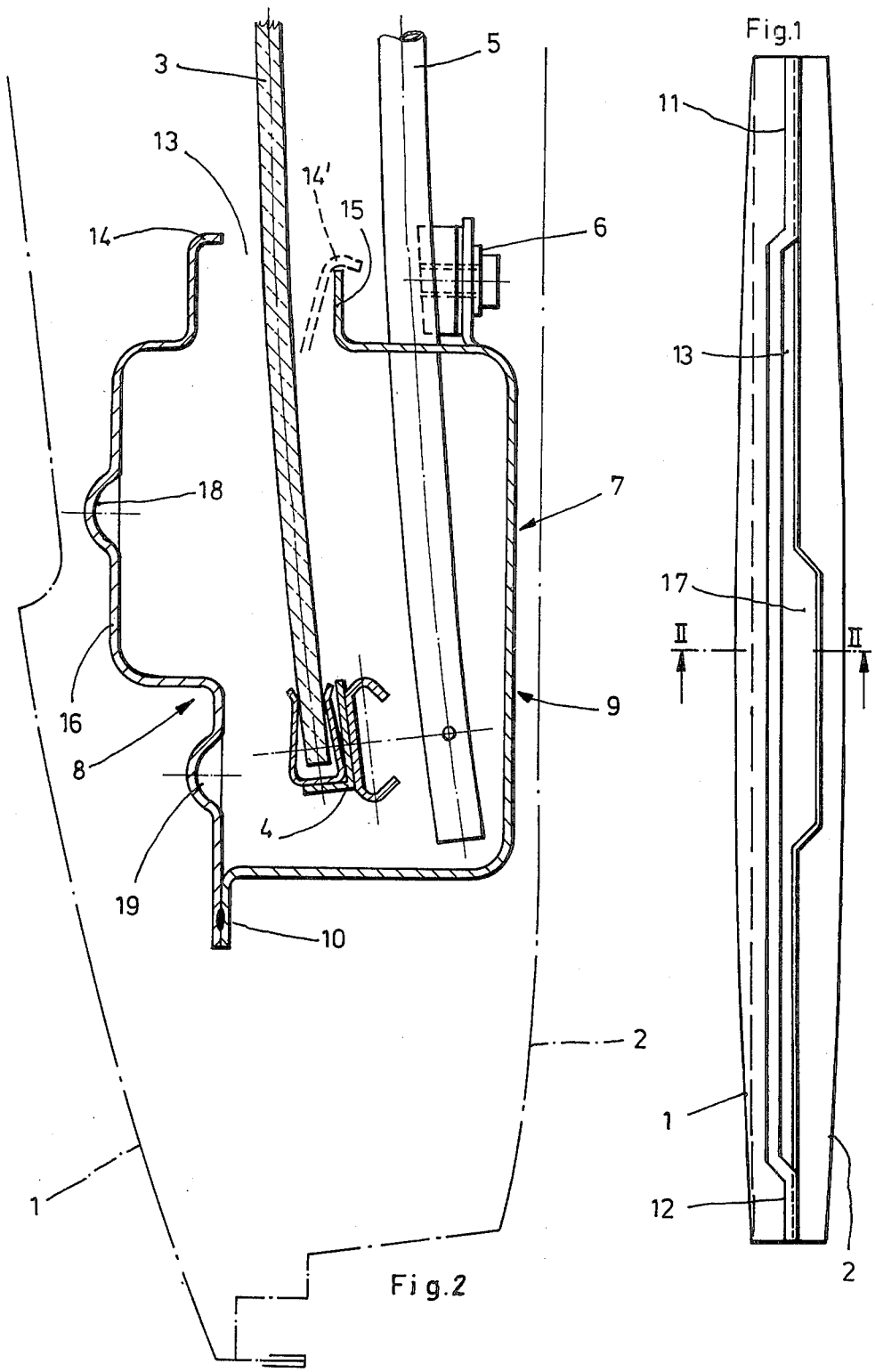

DOOR FOR VEHICLES, IN PARTICULAR MOTOR VEHICLES

BACKGROUND OF THE INVENTION

This invention relates to a door for vehicles, in particular motor vehicles, with a drop window shaft located between an inner and an outer wall of the door.

As is well known, vehicle design efforts are, among other things, directed towards reinforcing the side walls of the body, including the doors. This reinforcement of the side walls is done so that during a side impact — at least up to certain forces of impact — the walls will not collapse into the passenger compartment. Thus, Offenlegungsschrift No. 2,237,532.2 describes a door system with a longitudinal supporting member that bears in a certain fashion on the door pillars of the vehicle. Such a longitudinal supporting member, designed as a closed hollow section, may be advantageously employed only if the door has no drop window that extends within the region of the longitudinal supporting member or the door is so large that the window shaft may be located between the longitudinal member and the inside or outside wall of the door.

SUMMARY OF THE INVENTION

The present invention is directed to providing a vehicle door that is reinforced against impact with a longitudinal supporting member and, more particularly, a door with a drop window shaft located between the inner and outer wall of the door, and with no space for the window shaft between the supporting member and the inside or outside wall of the door.

In an illustrative embodiment of the invention a door is constructed with a hollow-section longitudinal supporting member surrounding at least the lower end of the window shaft. The upper part of supporting member is provided with an opening to permit the entry of the window. The opening in the upper part of the hollow-section longitudinal supporting member causes a reduction in its stiffness. However, the edge regions of the longitudinal supporting member in the region of the opening ensure that, after a certain deformation of the outer wall of the longitudinal supporting member during an impact on the door, a power-transmitting connection, between the two edges of the opening, will be automatically produced. Therefore, during a side collision a closed hollow section, that increases the strength of the supporting member and provides added protection for the passengers, is formed.

The door may be designed so that one of the edges of the hollow-section supporting member is formed by a first flange region pointing toward the other edge and the other edge is formed by a second flange region running substantially perpendicular to and ending under the first flange region. The first flange region overlaps the second flange region during an impact and results in a closure of the hollow section of the supporting member. This mutual overlapping of the two flange regions results in a connection between the edges of the opening so that a closed hollow section is obtained.

In one embodiment the hollow-section longitudinal supporting member is made up of a plurality of partial sections. In such a case there will, of course, be connections between these partial sections in all regions lying outside the split. These connections, as a rule, are spot welds.

BRIEF DESCRIPTION OF THE DRAWINGS

The foregoing and additional features of the present invention will be more readily apparent from the following detailed description and drawings in which:

FIG. 1 is a top view of a door of a motor vehicle, and

FIG. 2 is an enlarged sectional view of the door along line II—II in FIG. 1.

DESCRIPTION OF AN EXEMPLARY EMBODIMENT

It should be noted that in the figures only the door parts of interest to the invention are illustrated.

In the sectional view of FIG. 2 an outer wall of a vehicle door 1 and the inner wall of the door 2 are shown. Inside the door there is a shaft or space for a cranked window 3. The window 3 is provided at its lower end with means 4, of no concern to the present invention, for gripping a window lifter. Only the permanently installed sleeve 5 of the window lifter is illustrated. Sleeve 5 is designed to accept a window-lifting spiral, which is connected with the aforesaid devices 4 in a known manner. Device 6 is a means for operating the window lifter.

The lower region of the window shaft, i.e. the space provided for admission of the window 3, is surrounded by a hollow-section longitudinal supporting member 7. In this embodiment the member 7 is made up of two partial sections 8 and 9 that are spot welded together. In FIG. 2 spot welding connections are visible only at 10 near the bottom of the support member 7. However, the two partial sections 8 and 9 are also spot welded in regions 11 and 12 near the top of the support member 7. (See FIG. 1) The end of the support member 7 is solidly connected to the door.

In the plane of the drawing of FIG. 2 the supporting member 7 does not form a closed hollow section, but has an upper opening 13 for passage of the window 3. This weakens the door over a relatively great region with respect to a side impact. The weakness of the door, however, is largely overcome since the edge portions of the opening 13, are designed to form a composite power-transmitting connection during a side impact. The edge portion of the partial section 8 has a flange 14 that is bent over in the direction of the partial section 9. This flange 14 is higher than a flange 15 of the edge portion of partial section 9. Flange 15 runs approximately perpendicular to the partial section 9. During an impact the partial section 8 is forced around a pivot lying within the region of the connecting point 10 and the flange 14 is moved into the position indicated at 14'. When the two flanges 14 and 15 interlock during an impact, there is a stiffening of the longitudinal supporting member 7 as a result of the closure of its hollow section. The pivotal motion of partial section 8 is assisted by a step 16 in that section near the outer wall 1 of the door, since the point of attack of the force during a side impact is thereby applied to the upper region of this partial section.

With the present invention a side impact will accordingly result in a closed section of the longitudinal supporting member 7 in the region of the cranked window 3. Yet, in the region of passage of the sleeve 5 for the window lifting spiral, an opening 17 (FIG. 1) remains. This opening, which may have a small width, is so short, however, that its influence may be compensated for by the provision of corrugations, 18 and 19, in the partial section 8.

It is preferable to keep the clearance between the supporting member 7 and the outer wall 1 of the door as small as possible, so that the supporting member in the ideal case immediately supports the outer wall of the door. In a further refinement of the invention the supporting member 7 is connected in a force-transmitting manner over its entire length, with the inner wall 2 of the door and/or the outer wall 1 of the door. This force-transmitting connection can be made, for example, by adhesion or welding.

While the invention has been particularly shown and described with reference to a preferred embodiment thereof, it will be understood by those skilled in the art that various changes in form and details may be made therein without departing from the spirit and scope of the invention.

We claim:

1. A door for vehicles, particularly motor vehicles, having a shaft for a drop window located between an inner and an outer wall of the door, characterized in that at least the lower end of the shaft is surrounded by a hollow-section longitudinal supporting member located between the inner and outer walls of the door and having an opening in its upper region to permit entry of the window, the edges of the supporting member at the opening being formed as flange regions that overlap and interlock with each other so as to close the opening in the support member during a side impact on the outer wall of the door.

2. A door according to claim 1, characterized in that one of the edges is formed by a first flange region pointing toward the other edge and the other edge is formed by a second flange region running substantially perpendicular to and ending under the first flange region, said first flange region being adapted to overlap the second flange region in the event of an impact and to close the opening in the supporting member.

3. A door according to claim 2, characterized in that the first flange region is closer to the outer wall of the door than the inner wall of the door.

4. A door according to claim 1, characterized in that the supporting member is composed of at least two horizontally extending partial sections, said partial sections being force-transmittingly connected along their edges, except in the region of the opening in said support member.

5. A door according to claim 4, characterized in that said partial sections comprise an outer partial section located adjacent the outer wall of the door and an inner partial section located adjacent the inner wall of the door, said outer section having a sectional step pointing outward, and in that the force transmitting connection includes a lower connection of the two partial sections, said lower connection lying at least approximately under the flange region of the outer partial section.

6. A door according to claim 1, characterized in that the supporting member is forced-transmittingly connected with at least one of the inner wall or the outer wall of the door.

* * * * *